United States Patent [19]

DiAngelo et al.

[11] Patent Number: 6,101,482
[45] Date of Patent: Aug. 8, 2000

[54] UNIVERSAL WEB SHOPPING CART AND METHOD OF ON-LINE TRANSACTION PROCESSING

[75] Inventors: Michael F. DiAngelo, Round Rock, Tex.; Valerie J. Fox, Etobicoke, Canada

[73] Assignee: International Business Machines Corporation, Armonk, N.Y.

[21] Appl. No.: 08/929,044

[22] Filed: Sep. 15, 1997

[51] Int. Cl.$^7$ ........................................ G06F 17/60
[52] U.S. Cl. ........................ 705/26; 705/27; 395/200.57
[58] Field of Search ........................... 705/26, 27, 17; 395/200.57, 200.31, 200.47, 200.48, 200.49, 200.54, 200.58; 380/24, 25; 713/200, 201

[56] References Cited

U.S. PATENT DOCUMENTS

| | | | |
|---|---|---|---|
| 5,774,670 | 6/1998 | Montulli | 395/200.57 |
| 5,826,242 | 10/1998 | Montulli | 705/27 |

OTHER PUBLICATIONS

Newsbytes, pNEW10170030; "Open Mrket Intros 'Secure' Web Storefront"; Oct. 17, 1995.

*Primary Examiner*—Kevin J. Teska
*Assistant Examiner*—Demetra R. Smith
*Attorney, Agent, or Firm*—Jeffrey S. LaBaw; David H. Judson

[57] ABSTRACT

A method of purchasing products and services on-line using a client connectable to a plurality of servers via a computer network. The method begins by initiating from the client two or more independent transaction sessions, each of the independent transaction sessions established as a connection between the client and one of the plurality of servers is active. During each independent transaction session, transaction information is collected at the client to facilitate a purchase of products and services after the connection between the client and the server is closed and the transaction session is completed. According to the invention, the transaction information is maintained persistent across multiple independent transaction sessions. At a given time, for example, after all Web sites have been visited and the information gathered, the transaction information (as originally collected and/or as filtered, updated or enhanced) is then used to effect a purchase of given products and services.

32 Claims, 2 Drawing Sheets

UNIVERSAL WEB SHOPPING CART AND METHOD OF ON-LINE TRANSACTION PROCESSING

BACKGROUND OF THE INVENTION

1. Technical Field

The present invention relates generally to Internet electronic commerce and more particularly to a method of purchasing products and services on-line wherein transaction information is collected and maintained across multiple independent transaction sessions from heterogeneous web sites.

2. Description of the Related Art

The World Wide Web of the Internet is the most successful distributed application in the history of computing. In the Web environment, client machines effect transactions to Web servers use the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator) at a client machine involves specification of a link via the URL. In response, the client makes a request to the server identified in the link and receives in return a document formatted according to HTML.

During the success of the World Wide Web, electronic "shopping" on the Web is still in its infancy. Several business models have been recommended. Generally, they involve the creation of a information repository (in effect, a "shopping cart") that can be used to store transaction-related data as a user browses Internet Web sites and makes purchases. To this end, Sun Microsystems Laboratories has introduced the "Java Wallet" concept, based on the Java programming language and environment, which provides an open extensible framework for electronic transaction processing. The Java Wallet is intended to provide a vehicle by which a user may organize receipts, coupons and other electronic identification, and to provide a means by which such information may be electronically processed (along with a payment system) to effect Web commerce. A user of a Java Wallet theoretically will be able to see all of their purchases organized in a single transaction register. Another technology that has been proposed to facilitate such electronic "shopping" is the Microsoft Merchant Client, which uses a client-supported application, although similar approaches also can be done on the server side of the network. However, because no server dominates in the Internet space, a server implementation is not as viable as a client-side approach. In either case, the problem in implementing such approaches on a widespread basis lies in the lack of a common or "agreed upon" specification of the protocol for moving information in and out of the wallet/cart construct. Until such a protocol is defined and accepted, there will be no universal market implementation.

It would be highly desirable to provide a mechanism that would allow customers to have their own "virtual shopping cart," regardless of what shop or mall they visit on the Web. Customers should be able to browse any store, and at any time, and be able to choose an item for the cart and have any information applicable to that potential purchase retained to allow for a subsequent purchasing decision (regardless of when that decision is made). Existing or proposed technological solutions do not provide this capability. One "brute force" solution to this problem would be to merely open up multiple instances of a browser and establish connections between the client and multiple web sites. The information "collected" in each session could then be "cut and pasted" together in a wallet and presented to the user for the purchasing decision. Such an approach is quite impractical because of the significant amount of processing resources that would be consumed by the opening up and maintaining of multiple browser instances. Moreover, there would be no convenient way of maintaining the transaction information once the browser connections were terminated and/or using such information to complete some transaction.

The present invention addresses these and other deficiencies of the prior art.

BRIEF SUMMARY OF THE INVENTION

It is thus an object of this invention to provide an application that allows a user of a client machine having a browser to maintain a "universal" shopping cart in which transaction session information may be compiled.

It is a further object of the present invention to enable a Web browser to browse a Web "virtual" store at any time and choose an item (e.g., a product or service) for subsequent purchase even after the particular transaction session is no longer active.

It is still another important object to provide a client-side, universal Web "shopping cart" associated with and controlled by the user to facilitate Web commerce.

It is yet another object of this invention to maintain transaction information in a "virtual" shopping cart across multiple independent transaction sessions across heterogeneous web sites.

Still another important object of this invention is to facilitate purchase of goods and services over the Internet.

A more general object of this invention is to enable a Web shopper to browse a plurality of virtual "stores," to collect information about various products and services, and to make a purchasing decision based on the collected information.

Yet another object of this invention is to enable a user to suspend a purchasing decision until information from a plurality of independent "sessions" has been compiled, processed and/or updated or enhanced. This mechanism enables the user to "comparison" shop across unaffiliated Web sites before making a decision about which products to buy.

Still another more general object of this invention is to facilitate the seamless integration of electronic payment systems with a Web purchasing system.

Another object of this invention is to enable a Web purchase to appear as a natural )or at least transparent) part of the Web browsing experience.

These and other objects of the invention are provided by a method of purchasing products and services on-line using a client connectable to a plurality of servers via a computer network. The method begins by initiating from the client two or more independent transaction sessions, each of the independent transaction sessions established as a connection between the client and one of the plurality of servers is active. During each independent transaction session, transaction information is collected at the client to facilitate a purchase of products and services after the connection between the client and the server is closed and the transaction session is completed. According to the invention, the transaction information is maintained persistent across multiple independent transaction sessions. At a given time, for example, after all Web sites have been visited and the information gathered, the transaction information (as originally collected and/or as filtered, updated or enhanced) is then used to effect a purchase of given products and services. In particular, an actual purchase preferably is effected by re-establishing a connection between the client and a given one of the plurality of servers. The purchase transaction is then completed from the given server.

As briefly noted, the transaction information compiled from the various servers may be processed in some manner. Thus, for example, the information could be filtered according to some search or other criteria to determine which web site offers the best price or other terms that might impact the purchase decision. In an alternative example, the client may re-establish connection with a given web site from which the transaction information was originally compiled and receive from the web site new or updated information (e.g. a new, lower price) before the transaction is consummated. All such processing, filtering, updating or enhancing or the transaction information is facilitated by the present invention wherein the transaction information is retained in the client machine in a manner that allows such information to be readily accessed and reviewed by the user before the final purchasing decision is made. Once that decision is made, the client re-establishes connection with the is selected web site to complete the transaction.

Thus, in a general sense, the present invention contemplates maintaining a plurality of independent transaction sessions in "state" until a user of the client machine is prepared to make an informed purchasing decision.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
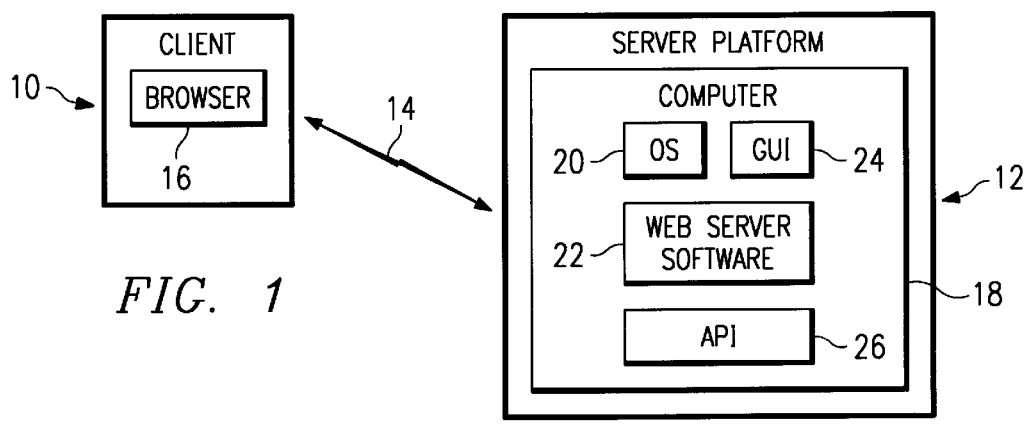
FIG. 1 is a representative system in which the present invention is implemented.

A representative system in which the present invention is implemented is illustrated in FIG. 1. A client machine 10 is connected to a Web server platform 12 via a communication channel 14. For illustrative purposes, channel 14 is the Internet, an Intranet or other known network connection. Web server platform 12 is one of a plurality of servers which are accessible by clients, one of which is illustrated by machine 10. A representative client machine includes a browser 16, which is a known software tool used to access the servers of the network. Representative browsers include, among others, Netscape Navigator (all versions), Microsoft Internet Explorer (all versions) or the like, each of which are "off-the-shelf" or downloadable software programs. The Web server platform (sometimes referred to as a "Web" site) supports files in the form of hypertext documents and objects. In the Internet paradigm, a network path to a server is identified by a so-called Uniform Resource Locator (URL). The World Wide Web is the Internet's multimedia information retrieval system. In particular, it is a collection of servers of the Internet that use the Hypertext Transfer Protocol (HTTP), which provides users access to files using Hypertext Markup Language (HTML).

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions. The platform 12 also includes a graphical user interface (GUI) 24 for management and administration. The various models of the RISC-based computers are described in many publications of the IBM Corporation, for example, RISC System/6000, 7013 and 7016 POWERstation and POWERserver Hardware Technical Reference, Order No. SA23-2644-00. AIX OS is described in AIX Operating System Technical Reference, published by IBM Corporation, First Edition (November 1985), and other publications. While the above platform is useful, any other suitable hardware/operating system/web server combinations may be used.

Figure 2:
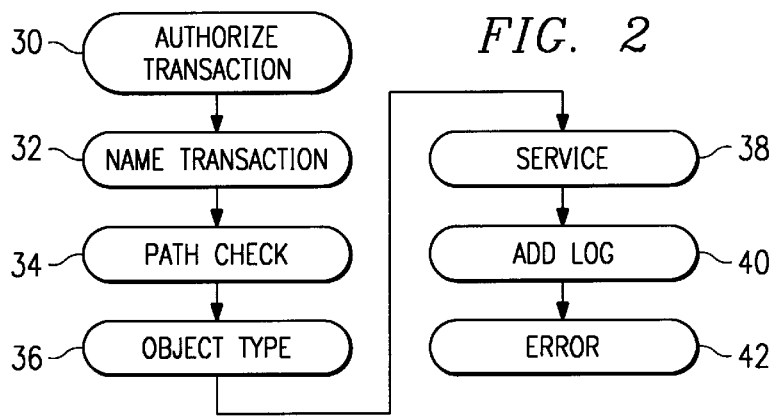
FIG. 2 is a flowchart showing the various server operations that are carried out in response to an HTML request issued from an Internet client.

The Web Server accepts a client request and returns a response. The operation of the server is governed by a number of server application functions (SAFS) 28, each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. The present invention may involve running a CGI program. At step 40, called Add Log (AddLog), information about the transaction is recorded. At step 42, called Error, the server responds to the client when it encounters an error. Further details of these operations may be found in the Netscape *Web Server*

*Programmer's Guide*, Chapter 5, which is incorporated herein by reference.

Thus, the Web server 18 includes a known set of server application functions (SAFS). These functions take the client's request and other configuration data of the server as input and return a response to the server as output. Referring back to FIG. 1, the Web server 12 also includes an Application Programming Interface (API) 26 that provides extensions to enable application developers to extend and/or customize the core functionality thereof (namely, the SAFS) through software programs commonly referred to as "plug-ins." The browser resident on the client machine also includes a similar API to which application "plug-ins" may be connected to provide additional client-side functionality.

Figure 3:
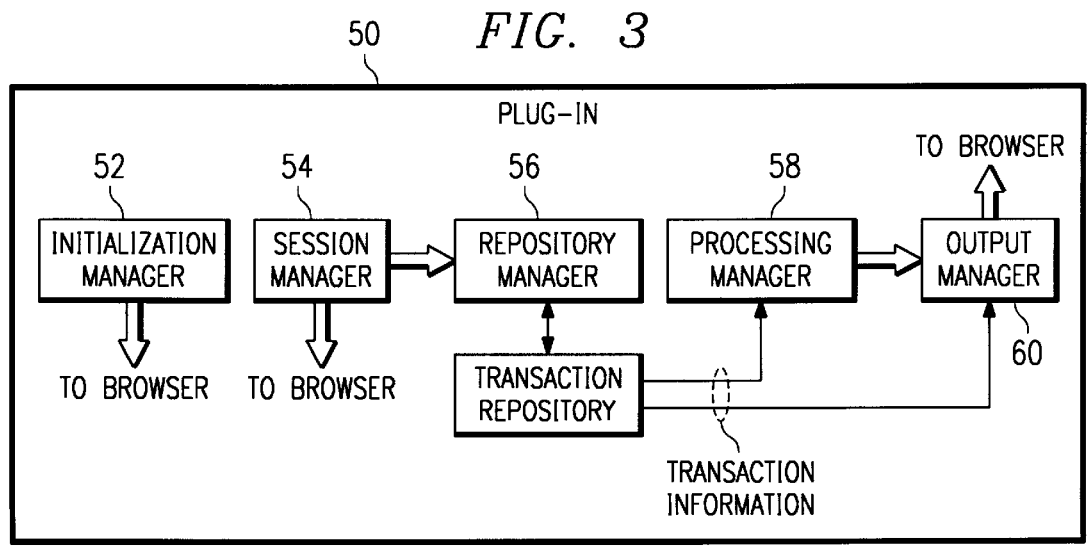
FIG. 3 is a block diagram of the various components of the universal shopping cart "plug-in" module of the present invention.

Referring back to FIG. 1, according to the present invention, the client machine includes a browser "plug-in" (which, alternatively, may be a standalone application) 50 that provides a universal shopping cart functionality. In a preferred implementation, the plug-in comprises a number of components that together provide the several advantages of the invention. The plug-in is illustrated in FIG. 3 and includes an initialization component 52, a transaction session manager component 54, a repository manager 56, a processing component 58, and an output manager component 60. All of these components interact with existing browser and/or operating system functions to facilitate the operation of the present invention, as will be seen below.

In general, the initialization manager component 52 interacts with some server via a known or hereinafter-developed authentication protocol to connect the plug-in to the server for a transaction "session." Although there may several ways of initiating a transaction session, one preferred technique is to have the server (to which the client is connected) initiate or launch the plug-in whenever a connection between the client and the server site is established. This launching may take place selectively from only certain web sites (e.g., sites that are "universal shopping cart-enabled" or the like). One technique for accomplishing the launching and authentication of a particular client is through the use of a "persistent client-side" cookie, as will be described below. By using such an approach, the user's personal information (e.g., name, location, credit card number, or other verifying or authenticating information) need only be entered into the plug-in one time (e.g., upon installation). Thereafter, such information is passed to a web site when the plug-in is initialized by the initialization manager. In this manner, the user need no longer re-input this information each time he or she browses to a new web site to begin a new transaction session.

Once the initialization manager initiates and/or verifies the connection to begin a transaction session, the transaction session manager component 54 takes over the processing. Transaction session manager 54 interacts with the browser to facilitate the providing of appropriate prompts and other control information to enable the user to collect transaction information during the session. Thus, for example, the transaction session manager 54 preferably initiates the display of a dedicated window (or other display area) in which appropriate information may be entered and passed to the server. One technique for accomplishing this transfer of information is through conventional CGI scripting techniques, described generally below. Through the session manager 54, transaction information is collected at the client machine during the transaction session. Such transaction "information" may be of varying types and of varying format; thus, for example, the transaction information includes one or more product identifiers, pricing data, shipping data (including freight costs, duties, taxes, etc.), availability data, inventory data, and other data (of any nature and type) describing the characteristics, qualities, uses or other features of the item. This information is received by the transaction session manager 54 and passed to the repository manager 56 which, in effect, acts as the "universal shopping cart." The transaction information may be maintained by the repository manager 56 in any convenient tabular, graphic or text format.

After a plurality of independent transaction sessions have been carried out, a user may then decide to make a purchasing decision. The processing component 58 and the output manager component 60 implement this function. In particular, the processing component 58 provides a logic function that processes the collected transaction information according to one or more rules or queries. Thus, for example, the processing component receives input commands from the user and processes those commands to "filter" the information collected from the multiple web sites. The input commands or queries may be provided by the user via a window or other command line interface, all in a known manner. The particular command or search query invoked is not within the scope of the present invention, although it is anticipated that some processing of the collected information will typically be done to enable the user to make an informed purchasing decision. In a simple example, the user may simply query the repository to return the name of the least expensive product in a group of similar products. A user may enter a command to "select the least expensive [name of product] that can be delivered by [a date certain]," which command would then be processed by the processing component to generate a "selection" according to the identified criteria. According to the present invention, the processing manager may also "update" or "enhance" the collected transaction information is some way to "add value" to the repository. Thus, for example, the processing manager may automatically or selectively re-connect to a given server to retrieve new product information or pricing/delivery update information. The processing manager may "enhance" the information, e.g., by modifying pricing or other cost information to take into consideration hidden costs (e.g., exchange rate fluctuations) that might otherwise bias a purchasing decision. The particular "logic" supplied by the processing manager is not limited to any specific of function.

When the user makes a selection, the processing manager 58 then passes the selection information to the output manager 60. Output manager is designed to interact with a given server site to finish, in effect, the transaction that began during the original transaction session. To this end, the output manager 60 controls the browser to re-establish connection between the client (namely, the shopping cart plug-in or application) and the web site so that a given transaction (which to that time had been held in "state") can then be completed. Once the connection is re-established, the appropriate commands and/or information are passed back and forth between the client and server (e.g., through CGI scripting or the like) to complete the purchase transaction.

Figure 4:
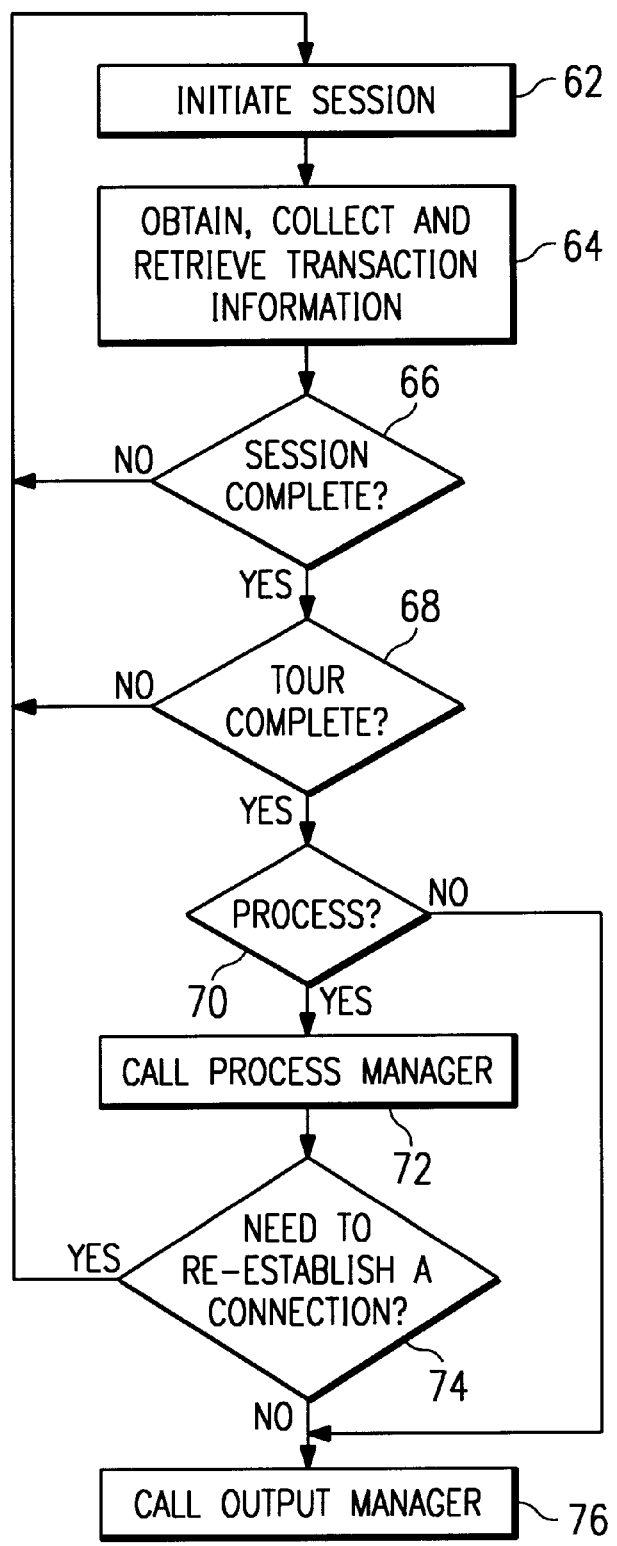
FIG. 4 is a flowchart of a preferred method for on-line purchase of products or services according to the present invention.

FIG. 4 is a flowchart describing a method of purchasing products and/or services on-line from a client running the universal shopping cart plug-in (or application) according to the present invention. The method begins at step 62 with the user initiating from the client a transaction session. As previously described, preferably the session is initiated with the client connecting to a web site (that may be "universal shopping cart"-enabled) using the initialization manager. The transaction session is established during some portion of a time period during which a connection between the client and the server is active. At step 64, the user interacts with the web site under the control of the session manager to obtain, collect and/or retrieve transaction information. Typically, such transaction information will be used to facilitate a purchase of products and services after the connection between the client and the web site is closed and the transaction session is completed. It should be appreciated that the transaction information may also be obtained just to "survey" product availability, product cost or for other reasons, and not only just to facilitate an purchase decision.

There are at least two ways information may be gathered and retained from current sessions. One approach is to use standard data architectures (or formats) or by converting existing data to a standard display form while maintaining an image of the original data to be used in subsequent ordering procedures. If each web site or store has adopted a standard shopping data architecture, such data can be held by the client and displayed later, for example, when shopping comparisons are made. However, not all sites may adopt a standard data architecture. For those sites that have not adopted a standard data architecture, there are several means of storing and recalling purchase information.

In the first approach, a table containing the top "n" (e.g., 100) shopping sites is included in at (or downloaded to) the client side to make the necessary transformation from non-standard (but known) data architectures to the standard set. Non-standard data architectures are identified in this approach by site URL or in any other convenient manner. Additional site entries are then added to the client side as their popularity increases. Site entries may then be removed when the site makes the transition to the standard data architecture. Auto-detection, for example, may be used to determine if the site is using the standard data architecture.

In the alternative, if the site is not using standard data architecture, and the site is not known to the transformation table, the client may attempt to populate the standard architecture data form by parsing the existing data and making appropriate transformations. Those items that are then selected for inclusion in the cart (and that are not in standard data architecture or in the table of known popular shopping sites) are parsed and then displayed to the user for verification or correction using the standard display format. Once accepted by the user, the standard display form, with additions or corrections, is held for later review as are any of the other items. Source data may also be held and identified as associated to the modified form for processing back to the originating site.

The above-identified processes, namely, storing of existing standard data, the results of table substitution for known non-standard data architectures, and the parsing and user verification for data architectures that are neither known nor in standard architecture, preferably occur in step 64. User verification also preferably occurs at step 64. Returning now back to the flowchart, at step 66, a test is made to determine whether a particular transaction session is complete. If not, the routine cycles back. If the outcome of the test at step 66 is positive (because, for example, the user has launched another URL or "minimized" the application), which indicates that the transaction session is complete, the routine continues at step 68 determine whether the user has completed his or her "shopping tour." In particular, it is envisioned that the inventive on-line shopping method involves the user traversing two or more heterogeneous web sites and collecting transaction information from these disparate sites. A pair of web sites may be deemed "heterogeneous" if they are under the management and control of unrelated parties or merchants. If the outcome of the test at step 68 is negative, the user is still "shopping" and the routine cycles back to step 62 to initiate a new, independent transaction session. Typically, the new sessions is initiated at another web site, although it may be appropriate for the user to go back to a once-visited site to obtain new, updated or additional transaction information. When, however, the output of the test at step 68 is positive, the user has finished the shopping tour.

The routine then continues at step 70 to test whether the collected information is to be processed. If the outcome of the test at step 70 is positive, the processing manager is called at step 72 to process the information. A test is then done at step 74 to determine whether the processing manager needs to re-establish a connection to a given site. If the outcome of the test at step 74 is positive, the routine cycles back to step 62 to re-initiate an appropriate connection. If, however, the outcome of the test at step 70 is negative (indicating that no processing of information is required) or when the outcome of the test at step 74 is negative (indicating that the processing manager (having processed the information as requested does not need to re-establish connection with a given site), the routine continues. At step 76, the output manager is called to complete the transaction. The routine then ends.

Thus, according to the present invention, the plug-in includes a repository manager that maintains a "shopping cart" in which transaction information is compiled and (if desired) processed in order to facilitate the user's decision to purchase a particular product or service. The plug-in is preferably launched when the client connects to a shopping cart-enabled web site. Generally, the transaction information is collected during particular transaction sessions that are independent of each other, and the information is stored in "state" until such time as the user decides to take some subsequent action. The processing of the transaction information according to the invention may involve filtering the collected information, updating the information, managing how the information is maintained in the repository or how the information is displayed to the user, enhancing the information or the like. If necessary, processing of the information may dictate that the connection between the client and a given server be re-established. The initialization manager advantageously stores a user's identifying information to obviate entry of such information during each transaction session. Moreover, the repository advantageously stores the transaction information in state until such time as the user desires to complete the transaction.

Although it is envisioned that the invention is used across multiple heterogeneous Web sites, this is not a requirement. Indeed, the inventive method of on-line transaction processing has wide applicability including the collection of transaction information from multiple sites controlled by a single entity. Thus, for example, a large corporation may run numerous Web sites at which several "virtual" stores are maintained. The "shopping cart" can be used in such an environment to collect and manage the transaction information in the manner previously described.

Although numerous display techniques could be used with the present invention, it is preferred that the shopping cart application execute in a separate window associated with the browser. This window could then be easily minimized but maintained on the desktop and re-opened when needed. When the application "encounters" a universal shopping cart-enabled Web site, intialization manager initializes the plug-in (through transfer of the authentication information), after which the window would "pop" open and prompt the user to begin the transaction session.

As noted above, one preferred technique for entering information to the server and receiving transaction information is through known CGI scripting techniques. AS is well-known, CGI is a World Wide Web standard for extending the functionality of HTML. CGI involves the combination of a live Web server and external programming scripts. CGI programs are typically used to return dynamic information and to respond to HTTP browser input in HTML forms. CGI programs usually run as child processes created under HTTP server processes.

As also noted above, the present invention uses Persistent Client State HTTP cookies to facilitate authentication of a user connecting to an enabled web site. Cookies are a known Internet mechanism which server-side connections (such as CGI scripts) can use to both store and retrieve information on the client side of the connection. A server, when returning an HTTP object to a client, may also send a piece of state information which the client will store. Typically, the state object, called a "cookie," may include a description of the range of URLs for which that state is valid. According to the *Persistent Client State HTTP Cookies* Preliminary Specification, which may be viewed at netscape.com at the path "/newref/std/cookie_spec_html," a cookie is introduced to the client by including a Set-Cookie header as part of an HTTP response, usually through a CGI script. Known cookie syntax is set forth below:

Syntax of the Set-cookie HTTP Response Header

This is the format a CGI script to add to the HTTP headers a new piece of data which is to be stored by the client for later retrieval.

Set-Cookie: NAME-VALUE; expires=DATE; path=PATH; domain=DOMAIN_NAME; secure

NAME=VALUE

This string is a sequence of characters excluding semi-colon, comma and white space. If there is a need to place such data in the name or value, some encoding method such as URL style % XX encoding is recommended, though no encoding is defined or required.

This is the only required attribute on the Set-Cookie header.

expires=DATE

The expires attribute specifies a date string that defines the valid life time of that cookie. Once the expiration date has been reached, the cookie will no longer be stored or given out.

The date string is formatted as

Wdy, DD-Mon-YYY HH:MM:SS GMT domain=DOMAIN_NAME

When searching the cookie list for a valid cookie, a comparison of the domain attributes of the cookie is made with the Internet domain name of the host from which the URL will be fetched. If there is a tail match, then the cookie will go through path matching to see if it should be sent. "Tail matching" means that domain attribute is matched against the tail of the fully qualified domain name of the host. A domain attribute of "acme.com" would match host names "anvil.acme.com" as well as "shipping.crate.acme.com".

Only hosts within the specified domain can set a cookie for a domain and domains must have at least two (2) or three (3) periods in them to prevent domains of the form: ".com", ".edu", and "va.us". Any domain that falls within one of the seven special top level domains listed below only require two periods. Any other domain requires at least three. The seven special top level domains are: "COM", "EDU", "NET", "ORG", "GOV", "MIL", AND "INT".

The default value of domain is the host name of the server which generated the cookie response.

path=PATH

The path attribute is used to specify the subset of URLs in a domain for which the cookie is valid. If a cookie has already passed domain matching, then the pathname component of the URL is compared with the path attribute, and if there is a match, the cookie is considered valid and is sent along with the URL request. The path "/foo" would match "/foobar" and "/foo/bar.html". The path "/" is the most general path.

If the path is not specified, it as assumed to be the same path as the document being described by the header which contain the cookie.

secure

If a cookie is marked secure, it will only be transmitted if the communications channel with the host is a secure one. Currently this means that secure cookies will only be sent to HTTPS (HTTP over SSL) servers.

If secure is not specified, a cookie is considered safe to be sent in the clear over unsecured channels.

Syntax of the Cookie HTTP Request Header

When requesting a URL from an HTTP server, the browser will match the URL against all cookies and if any of them match, a line containing the name/value pairs of all matching cookies will be included in the HTTP request. Here is the format of that line:

Cookie: NAME1=OPAQUE_STRINCG1; NAME2=OPAQUE_STRING2

One of the preferred implementations of the scheme of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

AS used herein, "Internet client" should be broadly construed to mean any computer or component thereof directly or indirectly connected or connectable in any known or later-developed manner to a computer network, such as the Internet. The term "Internet server" should also be broadly construed to mean a computer, computer platform, an adjunct to a computer or platform, or any component thereof. Of course, a "client" should be broadly construed to mean one who requests or gets the file, and "server" is the entity which downloads the file.

The present invention is not limited to purchase of any products or services. The terms "products" or "services" should thus be broadly construed to cover all types of items, including, without limitation, physical property, personal property, intellectual property, personal items, services, financial or other similar instruments, stocks, bonds, options and the like. Further, although the invention has been described in terms of a preferred embodiment in a specific transaction system environment, those skilled in the art will recognize that the invention can be practiced, with modification, in other and different system architectures with the spirit and scope of the appended claims. Thus, for example, the inventive technique of compiling and maintaining transaction information could be facilitated with other known products, such as Lotus® Notes for the Web, where the Lotus Notes Server, Domino, disseminates information to a user set that does in fact provide links to several shopping sites. The user then has direct access to shopping and a means of retaining a client side universal shopping cart, all as provided by the present invention.

Having thus described our invention, what we claim as new and desire to secure by Letters Patent is set forth in the following claims:

1. A method of purchasing products and services on-line using a client connectable to a plurality of servers via a computer network, comprising the steps of:

initiating from the client two or more independent transaction sessions, each of the independent transaction sessions established as a connection between the client and one of the plurality of servers is active;

during each independent transaction session, collecting transaction information at the client to facilitate a purchase of products and services after the connection between the client and the server is closed and the transaction session is completed;

maintaining the transaction information persistent across multiple independent transaction sessions;

processing the transaction information maintained across multiple independent transaction sessions;

filtering information from the independent transaction sessions to generate a selection; and at a given time, using the information to effect a purchase of given products and services.

2. The method as described in claim 1 wherein the step of using the information comprises re-establishing a connection between the client and a given one of the plurality of servers.

3. The method as described in claim 2 further including the step of completing a purchase transaction at the given one of the plurality of servers.

4. The method as described in claim 1 wherein the transaction information includes an offer to purchase a given product or service at a given price.

5. The method as described in claim 1 further including the step of processing the transaction information into standard user-readable form across multiple independent transaction sites.

6. The method as described in claim 1 further including the step of processing non-standard data converted to standard form using a predetermined item substitution table.

7. The method as described in claim 1 further including the step of processing non-standard and unknown data architectures to a standard format using item parsing.

8. The method as described in claim 1 further including the step of user verification of passed non-standard, unknown data architectures.

9. The method as described in claim 1 wherein the information is filtered based on a selection criteria entered by the user.

10. The method as described in claim 1 wherein the step of processing the information includes updating information from at least one independent transaction session.

11. The method as described in claim 10 wherein the information is updated by re-establishing a connection between the client and a given server.

12. The method as described in claim 11 wherein updating data is pushed from the given server to the client to update the information.

13. The method as described in claim 1 wherein the multiple independent transaction sessions are effected from at least two distinct servers.

14. The method as described in claim 13 wherein the two distinct servers are web sites and the computer network is the Internet.

15. The method as described in claim 14 wherein the two distinct servers are heterogeneous.

16. The method as described in claim 14 wherein the client includes a browser from which each multiple independent transaction session is initiated.

17. A method of purchasing products and services on-line from a client running a web browser and being connectable to a plurality of web sites, comprising the steps of:

initiating from the client two or more independent transaction sessions, each of the independent transaction sessions established as a connection between the client and one of the plurality of web sites is active;

during each independent transaction session, collecting transaction information at the client to facilitate a purchase of products and services after the connection between the client and the web site is closed and the transaction session is completed;

maintaining the transaction information persistent across multiple independent transaction sessions in a transaction repository;

processing the transaction information before completing the purchase transaction;

filtering information from the independent transaction sessions to generate a selection; and at a given time, re-establishing a connection between the client and a given one of the plurality of web sites to complete a purchase transaction.

18. The method as described in claim 17 further including the step of processing the transaction information before completing the purchase transaction.

19. The method as described in claim 17 wherein the step of processing the information includes updating information from at least one independent transaction session.

20. The method as described in claim 19 wherein the information is updated by re-establishing a connection between the client and a given server.

21. The method as described in claim 20 wherein updating data is pushed from the given server to the client to update the information.

22. A computer program product in a computer-readable medium for use in a computer to facilitate on-line purchase of products and services in a computer network having at least one Web client connectable to a plurality of Web server, wherein the Web client includes a browser, the computer program product comprising:

means for initiating from the client two or more independent transaction sessions, each of the independent transaction sessions established as a connection between the client and one of the plurality of servers is active;

means, operative during each independent transaction session, for collecting transaction information at the client to facilitate a purchase of products and services after the connection between the client and the server is closed and the transaction session is completed;

means for maintaining the transaction information persistent across multiple independent transaction sessions; and means for using the information to effect a purchase of given products and services.

23. The computer program product as described in claim 22 wherein the initiating means includes means responsive to a connection being established between the Web client and a given Web server for automatically launching a transaction session.

24. The computer program product as described in claim 22 wherein the maintaining means includes a repository.

25. The computer program product as described in claim 22 further including means for processing the transaction information.

26. A computer comprising:

a processor;

an operating system;

a Web browser having an application programming interface (API); and a plug-in to the API to facilitate on-line purchase of products and services, comprising:

means for initiating from the client two or more independent transaction sessions, each of the independent transaction sessions established as a connection between the client and one of the plurality of servers is active;

means, operative during each independent transaction session, for collecting transaction information at the client to facilitate a purchase of products and services after the connection between the client and the server is closed and the transaction session is completed;

means for maintaining the transaction information persistent across multiple independent transaction sessions;

means for processing the transaction information maintained across multiple independent transaction sessions;

means for filtering information from the independent transaction sessions to generate a selection; and means for using the information to effect a purchase of given products and services.

27. The computer as described in claim 26 wherein the initiating means includes means responsive to a connection being established between the Web client and a given Web server for automatically launching a transaction session.

28. The computer as described in claim 26 wherein the maintaining means includes a repository.

29. The computer as described in claim 26 further including means for processing the transaction information.

30. A method of compiling information on-line from a client running a web browser and being connectable to a plurality of web sites, comprising the steps of:

initiating from the client two or more independent transaction sessions, each of the independent transaction sessions established as a connection between the client and one of the plurality of web sites is active;

during each independent transaction session, collecting transaction information at the client to facilitate the user taking an action after the connection between the client and the web sites is closed and the transaction session is completed;

maintaining the transaction information persistent across multiple independent transaction sessions in a transaction repository;

processing the transaction information before taking the action;

filtering information from the independent transaction sessions to generate a selection; and at a given time, re-establishing a connection between the client and a given one of the plurality of web sites and taking the action.

31. The method as described in claim 30 wherein the transaction information is information to facilitate a product/service transaction.

32. The method as described in claim 31 wherein the action is a purchase selection.

* * * * *